United States Patent
Johnson et al.

(10) Patent No.: US 8,500,869 B1
(45) Date of Patent: Aug. 6, 2013

(54) ANTI-ROTATION DEAERATOR OUTLET DIFFUSER

(75) Inventors: Timothy A. Johnson, Rockford, IL (US); Jeff A. Brown, Cherry Valley, IL (US); Michael R. Blewett, Stillman Valley, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/529,427

(22) Filed: Jun. 21, 2012

(51) Int. Cl.
*B01D 19/00* (2006.01)

(52) U.S. Cl.
USPC ............... 95/261; 96/212; 96/219; 96/187; 184/6.23

(58) Field of Classification Search
USPC ............. 95/261; 96/211, 219, 210, 187, 96/212, 209; 184/6.23
See application file for complete search history.

(56) References Cited

U.S. PATENT DOCUMENTS

| | | | |
|---|---|---|---|
| 1,051,017 A | | 1/1913 | Schmidt |
| 2,385,522 A | * | 9/1945 | Malott .................. 184/6.23 |
| 2,762,451 A | * | 9/1956 | McNeil ................... 96/212 |
| 3,151,961 A | * | 10/1964 | Blackmore et al. ........... 96/210 |
| 3,224,173 A | | 12/1965 | Prescott |
| 3,240,003 A | | 3/1966 | Stroup et al. |
| 4,049,401 A | | 9/1977 | Smith |
| 5,510,019 A | * | 4/1996 | Yabumoto et al. ............ 210/137 |
| 5,776,229 A | | 7/1998 | Blanes et al. |
| 5,863,317 A | | 1/1999 | Smith et al. |
| 6,139,595 A | | 10/2000 | Herman et al. |
| 6,394,123 B2 | | 5/2002 | Menu et al. |
| 6,398,833 B1 | | 6/2002 | Santerre et al. |
| 6,858,056 B2 | | 2/2005 | Kwan |
| 6,893,478 B2 | | 5/2005 | Care et al. |
| 7,063,734 B2 | | 6/2006 | Latulipe et al. |
| 7,105,044 B2 | * | 9/2006 | Konishi et al. .................. 96/208 |
| 7,566,356 B2 | | 7/2009 | Latulipe et al. |
| 7,753,173 B2 | | 7/2010 | Gratzer et al. |
| 8,366,809 B2 | * | 2/2013 | Rollins et al. ................... 95/261 |
| 2003/0221560 A1 | * | 12/2003 | MacDuff ....................... 96/165 |
| 2005/0284299 A1 | * | 12/2005 | Lane et al. ...................... 96/209 |
| 2007/0039475 A1 | | 2/2007 | Unfried et al. |
| 2007/0163442 A1 | * | 7/2007 | Saito et al. ...................... 96/209 |
| 2008/0098893 A1 | * | 5/2008 | Ringenberger et al. ......... 95/261 |
| 2012/0234174 A1 | * | 9/2012 | Rollins et al. ................... 96/220 |

* cited by examiner

*Primary Examiner* — Duane Smith
*Assistant Examiner* — Douglas Theisen
(74) *Attorney, Agent, or Firm* — Kinney & Lange, P.A.

(57) ABSTRACT

A deaerator includes a case defining a vortex chamber, a fluid inlet for allowing a mixture of lubricating liquid and air to pass through the case into the vortex chamber, an air outlet for allowing air flow out of the deaerator, and a liquid outlet for allowing lubricating liquid flow out of the deaerator. A porous diffuser is positioned proximate the liquid outlet. A plate is positioned adjacent the porous diffuser and has a first surface in contact with the porous diffuser.

20 Claims, 5 Drawing Sheets

ANTI-ROTATION DEAERATOR OUTLET DIFFUSER

BACKGROUND

The present invention relates to lubrication systems, and in particular, to a deaerator for a lubrication system.

Certain lubrication systems function in a way that allows air to enter and be mixed with flow of lubricating liquid. Because it can be undesirable to have air in the lubricating liquid, deaerators are often used to separate air from lubricating liquid. For example, in gas turbine engines, lubrication systems typically use a deaerator to separate a scavenged mixture of air and lubricating liquid and to return the lubricating liquid to a reservoir for later use. It is desirable for the deaerator to supply the lubricating liquid to the reservoir with few or no air bubbles entrained in the lubricating liquid.

However, if the lubricating liquid leaves the deaerator at a relatively fast speed, that flow of lubricating liquid can agitate the surface of the lubricating liquid already in the reservoir, undesirably adding air bubbles to the lubricating liquid. A deaerator can be designed large enough that the lubricating liquid moves relatively slowly when it leaves the deaerator, but a large deaerator adds undesirable weight and also takes up valuable space.

SUMMARY

According to one embodiment of the present invention, a lubrication system includes a reservoir having an interior cavity for holding lubricating liquid and a deaerator positioned at least partially inside the interior cavity. The deaerator includes a vortex regulator plate dividing the deaerator into a vortex chamber and a diffuser chamber and a porous diffuser substantially filling the diffuser chamber.

Another embodiment of the present invention is a deaerator includes a case defining a vortex chamber, a fluid inlet for allowing a mixture of lubricating liquid and air to pass through the case into the vortex chamber, an air outlet for allowing air flow out of the deaerator, and a liquid outlet for allowing lubricating liquid flow out of the deaerator. A porous diffuser is positioned proximate the liquid outlet. A plate is positioned adjacent the porous diffuser and has a first surface in contact with the porous diffuser.

Another embodiment of the present invention is a method of deaerating a lubricating liquid. The method includes flowing a mixture of lubricating liquid and air from a plurality of gas turbine engine components into a vortex chamber of a deaerator, separating air from lubricating liquid in the vortex chamber, flowing separated lubricating liquid through a porous diffuser to a lubricating liquid reservoir, limiting rotation of the porous diffuser by pressing the porous diffuser between two surfaces, and flowing separated air through an air outlet to flow out of the deaerator, bypassing the porous diffuser.

DETAILED DESCRIPTION

Figure 1:
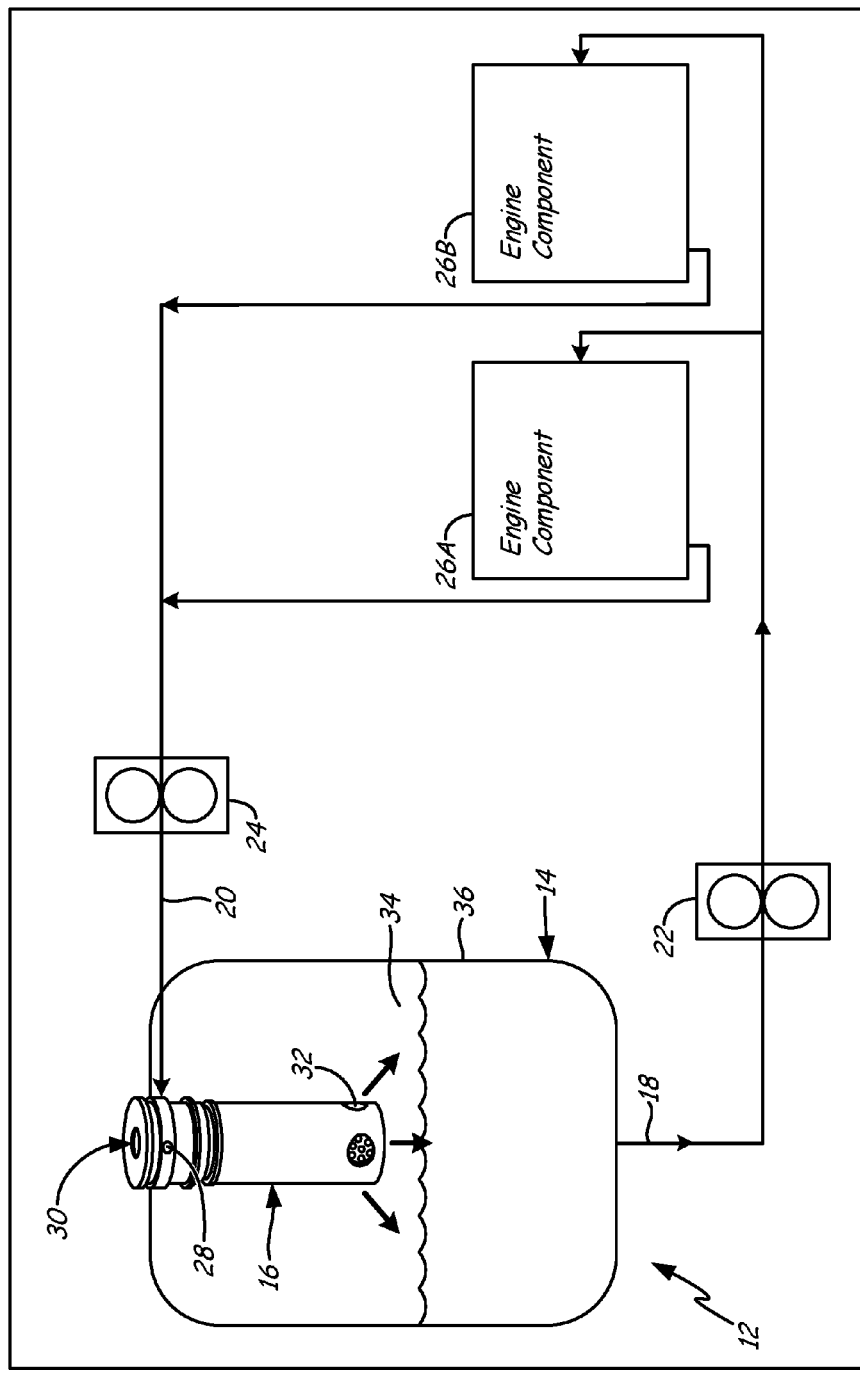
FIG. 1 is a schematic view of a gas turbine engine having a lubrication system.

FIG. 1 is a schematic view of gas turbine engine 10 having lubrication system 12. Lubrication system 12 includes reservoir 14, deaerator 16, supply passage 18, scavenge passage 20, supply pump 22, and scavenge pump 24. Supply pump 22 pumps a lubricating liquid, such as oil, from reservoir 14 to engine components 26A and 26B to cool and lubricate engine components 26A and 26B. Engine components 26A and 26B can be virtually any components on gas turbine engine 10 that benefit from lubricating liquid, such as gears and bearings. Scavenge pump 24 pumps lubricating liquid from engine components 26A and 26B and returns it to deaerator 16 in reservoir 14. Scavenge pump 24 can be sized and configured so as to scavenge air in engine components 26A and 26B in addition to the lubricating liquid. Consequently, a mixture of lubricating liquid and air is passed through fluid inlets 28 of deaerator 16.

Deaerator 16 separates the lubricating liquid from the air, passing the air out through air outlet 30 to the exterior of reservoir 14 and passing the lubricating liquid thorough liquid outlets 32 to interior cavity 34 of reservoir 14. Interior cavity 34 is defined by reservoir wall 36.

In the illustrated embodiment, deaerator 16 has a substantially cylindrical shape. Air outlet 30 is a single outlet on a top of deaerator 16. Fluid inlets 28 include four inlets (one of which is shown in FIG. 1) equally spaced around a perimeter of deaerator 16 near the top of deaerator 16. Fluid inlets 28 are arranged and shaped to impart high speed rotation of the air and oil mixture inside of deaerator 16. Liquid outlets 32 include four outlets (two of which are shown in FIG. 1) equally spaced around a perimeter of deaerator 16 near a bottom of deaerator 16. In alternative embodiments, deaerator 16 can have a different shape, and air outlet 30, fluid inlets 28, and liquid outlets 32 can be included in different numbers and positions as suitable for a particular application. Moreover, lubrication system 12 can also be different, having one or more additional or different connections or components, such as valves, filters, sensors, heat exchangers, etc.

Figure 2:
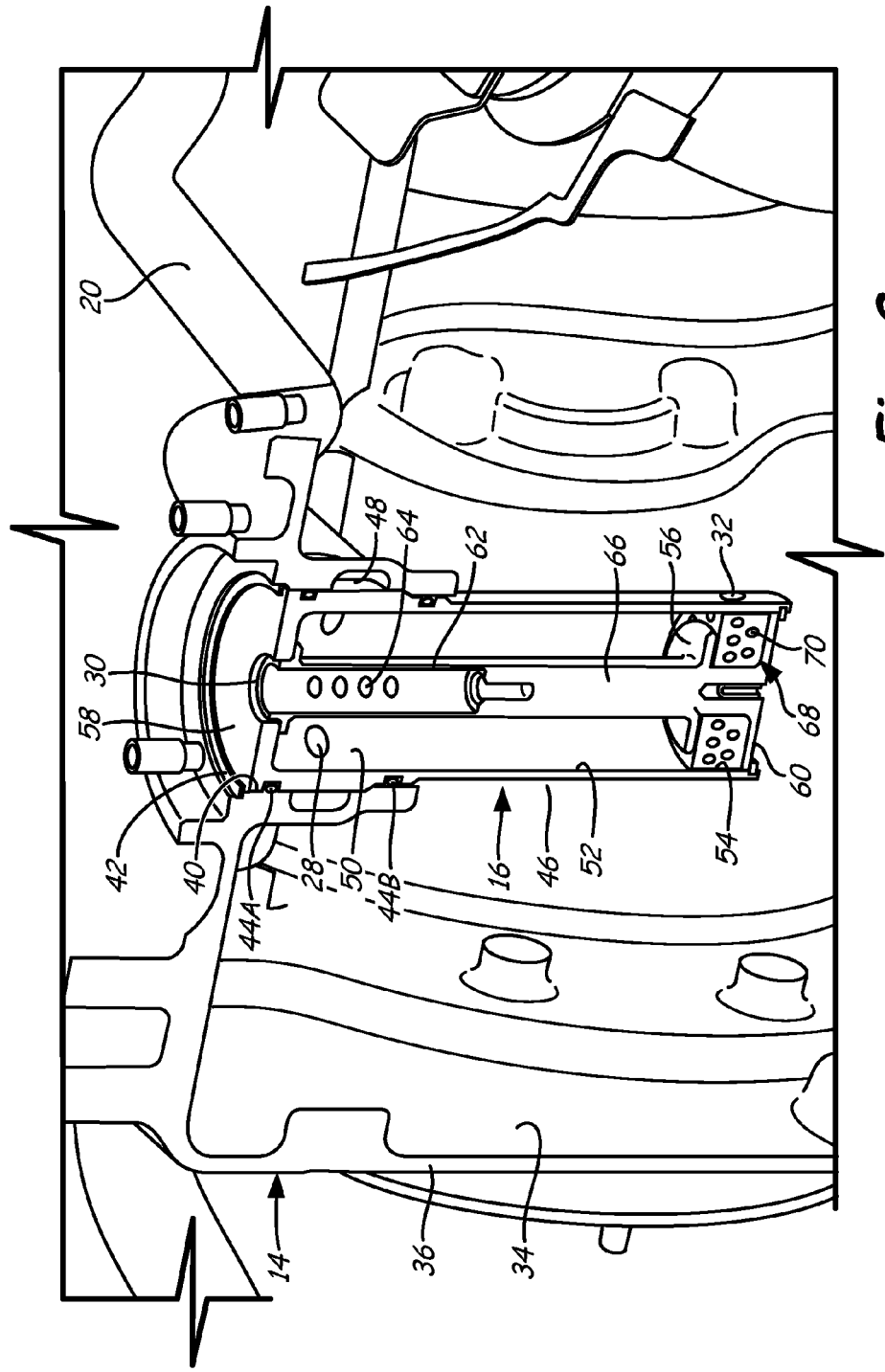
FIG. 2 is a perspective sectional view of a reservoir and deaerator of the lubrication system of FIG. 1.

FIG. 2 is a perspective sectional view of reservoir 14 and deaerator 16. Deaerator 16 is installed in socket 40 of reservoir 14 and held in place by retaining ring 42. In the illustrated embodiment, deaerator 16 is positioned substantially inside interior cavity 34 of reservoir 14. In an alternative embodiment, deaerator 16 can be positioned only partially inside interior cavity 34 of reservoir 14.

O-rings 44A and 44B provide seals between socket 40 and cylindrical case 46 of deaerator 16. Cylindrical case 46 of deaerator 16 is held substantially stationary with respect to reservoir 14. Inlet plenum 48 is positioned between socket 40 and case 46, sealed by o-ring 44A on top and o-ring 44B on bottom. Inlet plenum 48 receives the mixture of air and lubricating liquid from scavenge passage 20 prior to flowing it through fluid inlets 28 and into vortex chamber 50. Vortex chamber 50 is bounded and defined by inner surface 52 of case 46. Vortex regulator plate 56 is positioned in vortex chamber 50 between fluid inlet 28 and liquid outlet 32. Vortex chamber 50 is divided from diffuser chamber 54 by vortex regulator plate 56. Vortex chamber 50 is a top chamber above vortex regulator plate 56, and diffuser chamber 54 is a bottom chamber below vortex regulator plate 56. Deaerator top 58 provides a top for deaerator 16 and for vortex chamber 50. Deaerator bottom 60 provides a bottom for deaerator 16 and diffuser chamber 54. A radial gap between vortex regulator plate 56 and inner surface 52 allows a space for liquid flow from fluid inlets 28 to liquid outlets 32. Vortex regulator plate 56 limits air flow from fluid inlets 28 to liquid outlets 32. Air passage 62 is a substantially cylindrical passage positioned in a center of vortex chamber 50 and includes air inlets 64. Air inlets 64 allow air to flow from vortex chamber 50 through air passage 62 and out air outlet 30. Air passage 62 and vortex regulator plate 56 are spaced from deaerator bottom 60 by center support 66.

Diffuser 68 is positioned in diffuser chamber 54. Diffuser 68 is a porous diffuser, having pores 70. In the illustrated embodiment, diffuser 68 fills substantially all of the space in diffuser chamber 54 between deaerator bottom 60 and vortex regulator plate 56. Diffuser 68 has a substantially toroidal shape, with center support 66 positioned in a center of diffuser 68.

In operation, the mixture of lubricating liquid and air flows from scavenge passage 20, through inlet plenum 48, and through fluid inlets 28 into vortex chamber 50. Fluid inlets 28 are angled and aligned substantially tangentially with inner surface 52 of case 46 so as to induce vortex flow in vortex chamber 50. This vortex flow is induced without having to spin deaerator 16, which is substantially stationary with respect to the vortex flow within. The vortex flow separates the mixture of air and lubricating liquid, thus forcing separated air toward a center of vortex chamber 50 and forcing separated lubricating liquid toward a perimeter of vortex chamber 50. The separated air flows through air inlets 64, through air passage 62, and out air outlet 30 to a space outside of deaerator 16 and reservoir 14. Air flows directly from vortex chamber 50 to air passage 62, bypassing diffuser chamber 54 and diffuser 68. The separated lubricating liquid flows through the space between vortex regulator plate 56 and inner surface 52, into diffuser chamber 54, thorough diffuser 68, and then out liquid outlets 32 into interior cavity 34 of reservoir 14.

Parts of deaerator 16, including fluid inlets 28 and vortex chamber 50, can be sized and shaped to cause relatively fast fluid flow in vortex chamber 50. This causes the separated lubricating liquid passing through the space between vortex regulator plate 56 and inner surface 52 of case 46 to also flow relatively fast. The porous structure of diffuser 68 can slow the flow of the separated lubricating liquid as it passes through diffuser 68. This allows deaerator 16 to deliver separated lubricating liquid to reservoir 14 at a relatively slow flow speed. This can be particularly beneficial in situations where the liquid level in reservoir 14 is at or below liquid outlets 32. In such situations, a relatively fast flow of lubricating liquid from deaerator 16 could agitate the surface of the lubricating liquid in reservoir 14, undesirably adding air bubbles to the lubricating liquid in reservoir 14. Thus, use of diffuser 68 to reduce flow speed results in a reduced risk of agitation and a reduced risk of adding air bubbles. Because diffuser 68 can reduce such flow speeds, it allows for deaerator 16 to be designed as a relatively small and high speed deaerator. This can result in weight and space savings.

For example, deaerator 16 can be designed with a length to diameter ratio less than 7:1, such as about 4:1. In the illustrated embodiment, deaerator 16 has a diameter of about 2 inches (about 5 centimeters) and a height of about 8 inches (about 20 centimeters). Diffuser 68 also has a diameter of about 2 inches (about 5 centimeters) and a height of about 0.5 inches (about 1.3 centimeters). In alternative embodiments, deaerator 16 and diffuser 68 can have different sizes and shapes as suitable for a particular application.

Figure 3:
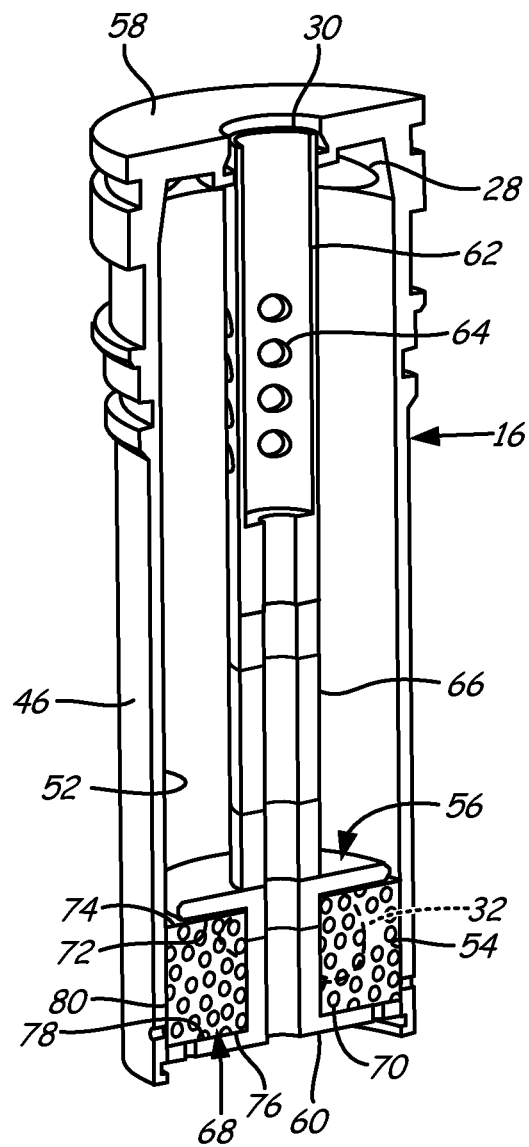
FIG. 3 is a perspective sectional view of an embodiment of the deaerator of FIG. 2.

FIG. 3 is a perspective sectional view of one embodiment of deaerator 16. Because of the relatively fast fluid flow in vortex chamber 50, that fluid can create a force on diffuser 68 tending to rotate diffuser 68 in diffuser chamber 54. If diffuser 68 were allowed to rotate, the effectiveness of diffuser 68 could be reduced. Diffuser 68 can be both deformable and resilient. As illustrated in FIG. 3, vortex regulator plate 56 is positioned adjacent diffuser 68 such that plate bottom surface 72 abuts diffuser top surface 74. Plate bottom surface 72 presses diffuser 68 against deaerator bottom 60, such that diffuser bottom surface 76 abuts surface 78 of deaerator bottom 60. Thus, diffuser 68 is in friction contact with plate bottom surface 72 and with surface 78 of deaerator bottom 60. This friction contact can create a force to resist rotation of diffuser 68 in response to the force of the relatively fast fluid flow.

When vortex regulator plate 56 presses against diffuser 68, it can cause diffuser 68 to compress in an axial direction (along center support 66) and expand in a radial direction (radially outward from center support 66). Diffuser side surface 80 is adjacent inner surface 52 of case 46. Diffuser side surface 80 is sufficiently close to inner surface 52 that when vortex regulator plate 56 presses against diffuser 68, radial expansion of diffuser 68 presses diffuser side surface 80 against inner surface 52 so as to be in friction contact. This friction contact can create an additional force to resist rotation of diffuser 68 in response to the force of the relatively fast fluid flow.

One of liquid outlets 32 is illustrated in FIG. 3 in phantom, behind diffuser 68. When vortex regulator plate 56 presses against diffuser 68, it can also cause diffuser 68 to expand into one or more of liquid outlets 32, creating a bulge of diffuser 68 in liquid outlets 32. This bulge of diffuser 68 can resist rotation of diffuser 68 in response to the force of the relatively fast fluid flow.

Figure 4:
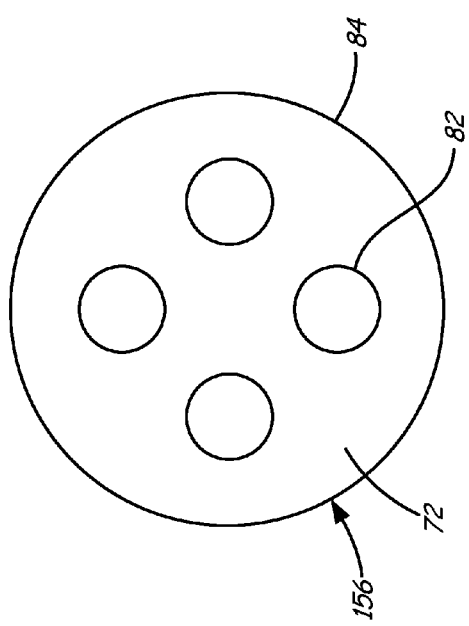
FIG. 4 is a bottom view of an alternative embodiment of a vortex regulator plate for use in the deaerator of FIGS. 1-3.

FIG. 4 is a bottom view of vortex regulator plate 156 in an embodiment, which is similar to vortex regulator plate 56 of FIGS. 2-3, except vortex regulator plate 156 has plate holes 82. Plate holes 82 are spaced radially inward from circumferential edge 84 of vortex regulator plate 156. When vortex regulator plate 156 presses against diffuser 68 (shown in FIGS. 2-3), it can also cause diffuser 68 to expand into one or more of plate holes 82, creating a bulge of diffuser 68 in plate holes 82. This bulge of diffuser 68 can resist rotation of diffuser 68 in response to the force of the relatively fast fluid flow.

Figure 5A:
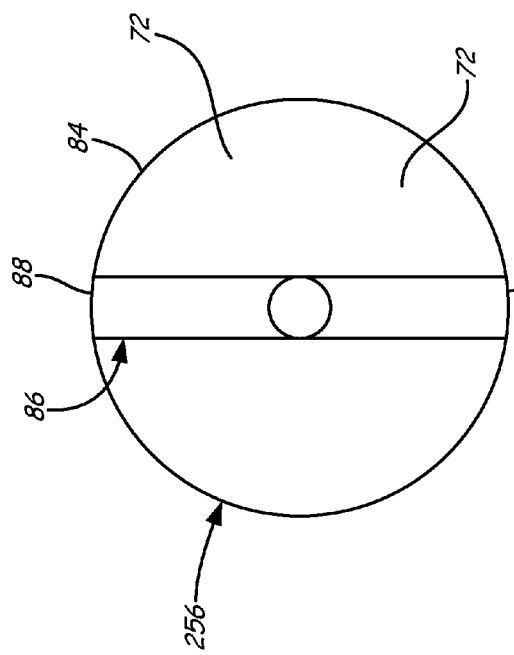
FIG. 5A is a bottom view of another alternative embodiment of a vortex regulator plate for use in the deaerator of FIGS. 1-3.

FIG. 5A is a bottom view of vortex regulator plate 256 in an embodiment, which is similar to vortex regulator plate 56 of FIGS. 2-3, except vortex regulator plate 256 has plate ridge 86. Plate ridge 86 is a projection extending from plate bottom surface 72 of vortex regulator plate 256. Plate ridge 86 extends across vortex regulator plate 256 from first ridge end 88 to second ridge end 90. First ridge end 88 and second ridge end 90 are each substantially adjacent circumferential edge 84. When vortex regulator plate 256 presses against diffuser 68 (shown in FIGS. 2-3), plate ridge 86 compresses diffuser 68, causing an indentation in diffuser 68. Thus, plate ridge 86 can resist rotation of diffuser 68 in response to the force of the relatively fast fluid flow. In alternative embodiments, plate ridge 86 can be replaced by one or more other projections that extend toward and compress diffuser 68. In further alternative embodiments, vortex regulator plates 56, 156, and 256 can include one or more other features that help resist rotation of diffuser 68.

Figure 5B:
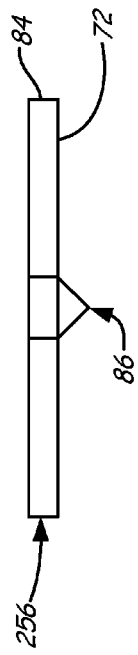
FIG. 5B is a side view of the vortex regulator plate of FIG. 5A.

FIG. 5B is a side view of vortex regulator plate 256. FIG. 5B illustrates plate ridge 86 extending from plate bottom surface 72.

Figure 6B:
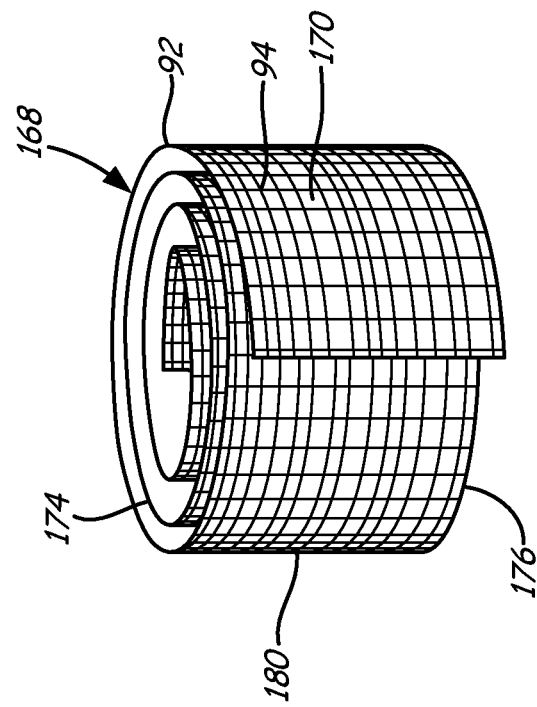
FIG. 6B is a perspective view of another embodiment of a diffuser for use with the deaerator of FIGS. 1-3.
Figure 6A:
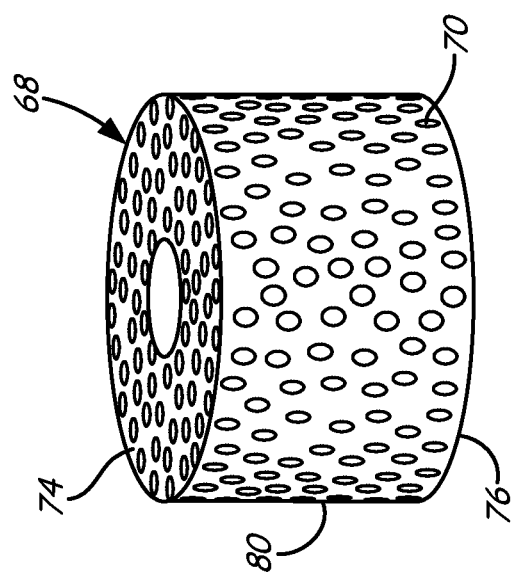
FIG. 6A is a perspective view an embodiment of a diffuser for use with the deaerator of FIGS. 1-3.

FIG. 6A is a perspective view of an embodiment of diffuser 68 for use with deaerator 16. In the embodiment of FIG. 6A, diffuser 68 is a metal mesh foam having numerous pores 70. Pores 70 are interconnected, allowing and slowing flow through the foam material of diffuser 68. The embodiment of diffuser 68 shown in FIG. 6A is substantially the same as that illustrated in FIGS. 2 and 3.

FIG. 6B is a perspective view of diffuser 168 in an embodiment, which is similar to diffuser 68 of FIG. 6A, except diffuser 168 is made from wire screen 92 rolled in a spiral shape, which can be seen when viewing diffuser top surface 174 or diffuser bottom surface 176. When wire screen 92 is rolled in a spiral shape, it effectively results in diffuser 168 having a substantially toroidal shape. Wire screen 92 includes a matrix of crossing wires 94, which can be seen viewing diffuser side surface 180. When wire screen 92 is rolled in a spiral shape, diffuser 168 effectively has numerous interconnected pores 170, allowing and slowing flow through diffuser 168. The embodiment of diffuser 168 shown in FIG. 6B is sized and shaped to replace diffuser 68 as illustrated in FIGS. 2 and 3.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, a diffuser need not necessarily be made of a metal mesh foam or a wire screen, but could in other embodiments be made of another suitably porous material.

The invention claimed is:

1. A lubrication system, comprising:
    a reservoir having an interior cavity for holding lubricating liquid; and
    a deaerator positioned at least partially inside the interior cavity, the deaerator comprising:
        a vortex regulator plate dividing the deaerator into a vortex chamber and a diffuser chamber; and
        a porous diffuser substantially filling the diffuser chamber.

2. The lubrication system of claim 1, and further comprising:
    a supply passage connecting the reservoir to a supply pump;
    a scavenge passage connecting a scavenge pump to a fluid inlet of the vortex chamber; and
    a plurality of gas turbine engine components connected to both the supply pump and the scavenge pump via the supply passage and the scavenge passage, respectively.

3. The lubrication system of claim 1, wherein the porous diffuser is compressed between the vortex regulator plate and a bottom of the deaerator.

4. A deaerator, comprising:
    a case defining a vortex chamber;
    a fluid inlet for allowing a mixture of lubricating liquid and air to pass through the case into the vortex chamber;
    an air outlet for allowing air flow out of the deaerator;
    a liquid outlet for allowing lubricating liquid flow out of the deaerator;
    a porous diffuser positioned proximate the liquid outlet; and
    a plate positioned adjacent the porous diffuser and having a first surface in contact with the porous diffuser.

5. The deaerator of claim 4, wherein the plate comprises:
    a vortex regulator plate positioned in the vortex chamber between the fluid inlet and the liquid outlet.

6. The deaerator of claim 5, wherein the vortex regulator plate limits air flow from the fluid inlet to the liquid outlet and wherein a radial gap between the vortex regulator plate and an inner surface of the case allows liquid flow from the fluid inlet to the liquid outlet.

7. The deaerator of claim 5, wherein the porous diffuser is compressed between the vortex regulator plate and a bottom of the deaerator.

8. The deaerator of claim 7, wherein the case is substantially cylindrical, and wherein the porous diffuser is compressed against the case.

9. The deaerator of claim 4, wherein the plate comprises a hole and wherein the porous diffuser bulges into the hole.

10. The deaerator of claim 4, wherein the porous diffuser bulges into the liquid outlet due to compressive force exerted by the plate.

11. The deaerator of claim 4, wherein the plate comprises:
    a projection extending from the plate and compressing the porous diffuser.

12. The deaerator of claim 11, wherein the plate is substantially disk shaped with a circumferential edge, wherein the projection is a ridge extending across the plate from a first ridge end adjacent the circumferential edge to a second ridge end adjacent the circumferential edge.

13. The deaerator of claim 4, wherein the porous diffuser comprises a metal mesh foam.

14. The deaerator of claim 4, wherein the porous diffuser comprises a wire screen rolled in a spiral shape.

15. A method of deaerating a lubricating liquid, the method comprising:
    flowing a mixture of lubricating liquid and air from a plurality of gas turbine engine components into a vortex chamber of a deaerator;
    separating air from lubricating liquid in the vortex chamber;
    flowing separated lubricating liquid through a porous diffuser to a lubricating liquid reservoir;
    limiting rotation of the porous diffuser by pressing the porous diffuser between two surfaces; and
    flowing separated air through an air outlet to flow out of the deaerator, bypassing the porous diffuser.

16. The method of claim 15, wherein rotation of the porous diffuser is limited due to friction between the porous diffuser and the two surfaces.

17. The method of claim 15, wherein rotation of the porous diffuser is limited due to friction between the porous diffuser and a third surface, wherein the third surface comprises an inner surface of a case of the deaerator.

18. The method of claim 15, wherein pressing the porous diffuser causes a portion of the porous diffuser to bulge into a hole.

19. The method of claim 18, wherein the first surface is a surface of a vortex regulator plate and wherein the hole extends through the vortex regulator plate.

20. The method of claim 18, wherein the hole is a liquid outlet extending through a cylindrical case of the deaerator.

* * * * *